US009228681B2

(12) United States Patent
Kluss

(10) Patent No.: US 9,228,681 B2
(45) Date of Patent: Jan. 5, 2016

(54) PIPE COUPLING

(75) Inventor: William Vernon Kluss, Woombye (AU)

(73) Assignee: RELIANCE WORLDWIDE CORPORATION (AUST.) PTY. LTD., Melbourne (AU)

( * ) Notice: Subject to any disclaimer, the term of this patent is extended or adjusted under 35 U.S.C. 154(b) by 91 days.

(21) Appl. No.: 14/002,454

(22) PCT Filed: Feb. 29, 2012

(86) PCT No.: PCT/AU2012/000201
§ 371 (c)(1),
(2), (4) Date: Oct. 16, 2013

(87) PCT Pub. No.: WO2012/116403
PCT Pub. Date: Sep. 7, 2012

(65) Prior Publication Data
US 2014/0033507 A1 Feb. 6, 2014

(30) Foreign Application Priority Data

Mar. 3, 2011 (AU) ................. 2011900760

(51) Int. Cl.
*F16L 37/091* (2006.01)
*F16L 21/02* (2006.01)
*F16L 49/02* (2006.01)
(52) U.S. Cl.
CPC ............... *F16L 21/02* (2013.01); *F16L 37/091* (2013.01); *F16L 49/02* (2013.01); *Y10T 29/49947* (2015.01)
(58) Field of Classification Search
CPC ..... F16L 37/0844; F16L 37/04; F16L 37/096; F16L 37/091
USPC .......................................... 285/340, 314, 315
See application file for complete search history.

(56) References Cited

U.S. PATENT DOCUMENTS 2,125,477 A * 8/1938 Whitney ........................ 285/308
3,837,687 A * 9/1974 Leonard ........................ 285/315
4,717,179 A * 1/1988 Haberstock et al. .......... 285/340
(Continued)

FOREIGN PATENT DOCUMENTS

EP 0745801 A1 12/1996
EP 0785386 A1 7/1997
(Continued)

OTHER PUBLICATIONS

International Search Report and Written Opinion for Application No. PCT/AU2012/000201 dated Mar. 22, 2012.
Extended European Search Report for Application No. 12752893.3 dated Jul. 30, 2014.

*Primary Examiner* — David E Bochna
(74) *Attorney, Agent, or Firm* — Bush Intellectual Property Law; Kenneth M. Bush

(57) ABSTRACT

A coupling (10) for receiving and retaining the end of a conduit. The coupling (10) includes a leading body part (12), a grab ring (14), a sealing ring (16), a trailing body part (18) and a sleeve (11). The trailing body part (18) has an outer surface portion (46) which is inclined to diverge outwardly and a rear face (20) that extends from a trailing end of the outer surface (46), and that faces axially. The sleeve (11) extends circumferentially around the leading body part (12), the grab ring (14), the sealing ring (16) and the trailing body part (18). The sleeve (11) includes a forward end (24) for engaging the leading body part (12) a first axial portion (23) which extends from the forward end (24), an inclined portion (22) which extends from the axial portion (23) and which is inclined complimentary to the outer surface portion (46). The sleeve (11) further includes a trailing end portion (21) that extends from the inclined portion (22) to overlie the rear face (20) of the trailing body part (18) in close facing relationship. The sleeve (11) is operable to resist movement of the leading and trailing body parts (12, 18) axially away from each other.

11 Claims, 4 Drawing Sheets

(56) References Cited

U.S. PATENT DOCUMENTS

| | | | | |
|---|---|---|---|---|
| 5,692,784 | A * | 12/1997 | Hama et al. | 285/340 |
| 6,450,550 | B1 * | 9/2002 | Cornwell | 285/340 |
| 7,475,913 | B2 * | 1/2009 | Muto | 285/308 |
| 7,644,955 | B1 * | 1/2010 | Komolrochanaporn | 285/340 |
| 7,878,555 | B2 * | 2/2011 | Oh | 285/340 |
| 8,303,001 | B2 * | 11/2012 | Oh | 285/340 |
| 8,844,981 | B1 * | 9/2014 | Crompton et al. | 285/340 |
| 2011/0025054 | A1 | 2/2011 | Kluss | |
| 2012/0074695 | A1 | 3/2012 | Salehi-Bakhtiari | |

FOREIGN PATENT DOCUMENTS

| | | | |
|---|---|---|---|
| EP | 0897082 A1 | 2/1999 | |
| GB | 2146400 A | 4/1985 | |
| GB | 2155576 A * | 9/1985 | F16L 21/08 |
| GB | 2431210 A | 4/2007 | |
| NL | 9500045 A | 8/1996 | |
| WO | 97/03314 A1 | 1/1997 | |
| WO | 0011389 A1 | 3/2000 | |
| WO | 2010080027 A1 | 7/2010 | |

\* cited by examiner

PIPE COUPLING

CROSS-REFERENCE TO RELATED APPLICATIONS

The present application is a national phase entry under 35 U.S.C. §371 of International Application No. PCT/AU2012/000201, filed Feb. 29, 2012, published in English, which claims the benefit of Australian Application No. 2011900760, filed Mar. 3, 2011, all of which are incorporated herein by reference.

FIELD OF THE INVENTION

The present invention relates to a coupling and to a method of manufacturing a coupling for connecting pipes to other pipes and pipes to fittings, such as valves.

BACKGROUND OF THE INVENTION

A reference herein to a patent document or other matter which is given as prior art is not to be taken as an admission that that document or matter was known or that the information it contains was part of the common general knowledge as at the priority date of any of the claims.

Couplings are used to connect pipes to pipes, or pipes to fittings such as valves or meters. Couplings can thus facilitate end-to-end connection of pipe sections, or they can route the pipe sections at particular angles. For example, couplings can be employed to change the direction of piping, such as by 45° or 90°. In addition, couplings can be employed to branch or split piping in different directions. For example, a single pipe section can be connected by a T-fitting or a Y-fitting, each of which branches that pipe section into two separate pipe sections. Other fittings can branch a single pipe section into more than two separate pipe sections.

Couplings preferably are easy and quick to use and are relatively inexpensive. Moreover, the couplings typically need to provide a watertight or airtight fitting. The couplings of the present invention could be used in piping installations which convey liquids or liquid slurries, i.e. sewerage for example, and they can also be used for piping gases. The couplings should also provide secure connection to the ends of the pipe sections or other fittings to which they are connected.

Couplings are usually exposed to the fluid carried within the piping installations to which the couplings are fitted. Moreover, the pipe couplings are often exposed to external conditions such as wind and rain, dust and grime etc. Accordingly, in the past, some pipe couplings have been manufactured from non-ferrous metal to prevent rusting and corrosion. Brass has been one metal employed for that purpose. While the use of brass for the manufacture of pipe couplings has been effective in resisting rust and corrosion, a drawback with brass is that it is both relatively heavy and in more recent times, expensive. The weight of brass does not affect the actual performance of a brass coupling or cause difficulties in installation, but rather, the weight adds cost when the couplings are transported in bulk. Combined with the increasing cost of brass metal, the cost of brass fittings is becoming prohibitive.

Moreover, when a pipe coupling is employed in piping installations that carry drinking water, the exposure of that water to the brass material can taint the flavour of the water unacceptably. In addition, it has been recognised that metals can contain potentially harmful agents such as lead, which can leech from the metal into the fluid carried within the piping installation. Because of this, certain countries have introduced regulations limiting the content of such agents in the materials used in pipe couplings. As a result, in order to satisfy the regulations, more expensive metal fittings have become necessary.

The present invention aims to provide a pipe coupling, which provides advantages over certain types of couplings in present use. Applicant is hopeful that the present invention can provide cost and weight savings compared to some pipe couplings in use presently, and/or potentially can also reduce the likelihood of the flavour of drinking water being tainted as described above, and/or reduce the likelihood of potentially harmful agents leeching into the fluid carried within the piping installation.

SUMMARY OF THE INVENTION

In one form of the invention there is provided a coupling for coupling to an end of a conduit, the coupling being arranged to receive the conduit end and to retain the conduit end relative to the coupling, the coupling including,
- a leading body part,
- a grab ring for gripping the outer surface of the conduit end to restrain the conduit end against retraction out of the coupling, the grab ring being adjacent the leading body part,
- a sealing ring for sealing against the outer surface of the conduit end and being adjacent the grab ring
- a trailing body part adjacent the sealing ring, and
- a sleeve,
- the leading body part, the grab ring, the sealing ring and the trailing body part being aligned axially in the direction of insertion of a conduit end into the coupling,
- the trailing body part having an outer surface portion which is inclined to diverge outwardly from a smaller diameter to a larger diameter in the direction of insertion of a conduit end into the coupling, and a rear face that extends from a trailing end of the inclined outer surface portion that faces axially
- the sleeve extending circumferentially about the leading body part, the grab ring, the sealing ring and the trailing body part and including a forward end for engaging the leading body part, a first axial portion extending from the forward end, a second inclined portion extending from the first axial portion which is inclined complementary to and in close facing relationship with the inclined outer surface portion of the trailing body part, and a trailing end portion extending from the second inclined portion to overly the rear face of the trailing body part in close facing relationship, the sleeve being operable to resist movement of the leading and trailing body parts axially away from each other.

A coupling according to the invention can be manufactured in a manner that the trailing end portion can be formed into position after the other components of the coupling have been inserted into the sleeve, or the sleeve has been positioned about the components. Thus, the trailing end portion can be an extension of the second inclined portion at the same angle for example, or it could extend at a different angle. For example, it could extend axially. What is intended is that the trailing end portion does not impede access to the inside of the sleeve until the sleeve and all of the other relevant components of the coupling have been assembled together with the components within the sleeve, where after the trailing end portion can be formed into the position of overlying the rear face of the trailing body part.

The inclined outer surface portion of the trailing body part and the second inclined portion of the sleeve can advantageously provide a form of connection, attachment or lock between the trailing body part and the sleeve by frictional engagement when the trailing body part and the sleeve are assembled together but before the trailing end portion is formed into the position of overlying the rear face of the trailing body part. In other words, the sleeve can become attached to the trailing body part though contact between the respective inclined parts. The lock or attachment is by frictional jamming between the parts, although the actual jamming or frictional load is not required to be high. The lock or attachment can be sufficient to hold the components of the coupling in place while the trailing end portion undergoes the forming operation and while the coupling is shifted about different stations in the manufacturing process. This is highly advantageous for the manufacture of the coupling and avoids the need for other fastening arrangements to maintain the trailing body part and the sleeve together as required is some other prior art manufacturing techniques.

The angle of the second inclined portion and the complementary inclined outer surface portion of the trailing body part can be any suitable angle. For example, a large angle such as up to 45° or more can be employed, although it is expected that a lesser angle such as in the range of 2° to 20° is more likely. The angle could for example, be about 5°. Other angles could be appropriate and are within the scope of the present invention.

In some forms of the invention, the material of the sleeve can be metal, stainless steel for example, and the material of the trailing body part can be plastic and the connection, attachment or lock between the sleeve and the body part will occur as set out above. This combination of materials is highly desirable as providing optimal performance characteristics at an optimal cost and weight. The sleeve is preferably a metal that is readily formed and stainless steel meets that requirement. Other metals will also meet that requirement.

In the above arrangement, the sleeve firstly has a partially assembled condition in which the forward end, the first axial portion and the second inclined portion fit about the leading body part, the grab ring, the sealing ring and the inclined outer surface of the trailing body part, and in this condition, the trailing end portion of the sleeve defines an open end to enable assembly of the aforementioned components and the sleeve together, either by inserting the components into the sleeve or by moving the sleeve over the components. The sleeve then has an assembled condition, in which the trailing end portion is formed to overly the rear face of the trailing body part in close facing relationship. In this position, the sleeve is operable to resist movement of the leading and trailing body parts axially away from each other.

The coupling can also include an intermediate ring between the grab ring and the sealing ring which is aligned axially with the leading body part, the grab ring, the sealing ring and the trailing body part in the direction of insertion of a conduit end into the coupling. The intermediate ring can be a protection ring to prevent contact between the grab ring and the sealing ring, so as to protect the sealing ring from damage from the grab ring.

In the above arrangement, the first axial portion of the sleeve can extend about a portion of the leading body part, the grab ring and a portion of the intermediate ring.

The sealing ring will typically be an O-ring formed of natural or synthetic rubber.

The leading body part can include an annular extension or ring within which the grab ring and the intermediate ring are accommodated. The annular extension or ring can be an integral part of the leading body part. Thus, the leading body part can form a cartridge within which each of the demount ring, the grab ring and the intermediate ring are accommodated, so that one or more of those components can be inserted into the cartridge for insertion as a unit into the sleeve during assembly of the coupling.

The seal and the trailing body part can also be assembled as a unit and so the coupling assembly can comprise insertion of the cartridge within the sleeve followed by insertion of the unit formed by the seal and the trailing body part, so that effectively the assembly is a two part process. With the coupling assembled as indicated above, the trailing end portion of the sleeve can then be formed rolled to overly the rear face of the trailing body part in close facing relationship and the assembly is complete.

It is to be noted that the rear face is not required to extend perpendicular to the axis of the coupling to satisfy the requirement to face axially. The rear face can be inclined to the axis and still satisfy the requirement. For example, the rear face could extend at a 45° angle to the axis and still face axially as required.

The invention also provides a method of assembling a coupling of the above kind, the method including:
inserting the leading body part, the grab ring, the sealing ring and the trailing body part into the sleeve so that:
the forward end of the sleeve engages the leading body part,
the leading body part, the grab ring, the sealing ring and the trailing body part are aligned axially in the direction of insertion of a conduit end into the coupling, and
the inclined outer surface of the trailing body part and the second inclined portion of the sleeve are in facing engagement,
forming the trailing end portion of the sleeve to overly the rear face of the trailing body part in close facing relationship.

The forming part of the method can be any suitable forming operation such as spin forming, or any other suitable forming method such as crimping.

As indicated above, the leading body part can include an annular extension or ring within which the grab ring and the intermediate ring (if provided) are accommodated, so that the leading body part forms a cartridge accommodating each of the demount ring, the grab ring and the intermediate ring (if provided) in a cartridge form for insertion as a unit into the sleeve during assembly of the coupling.

The trailing body part of the coupling can include a recess in which the sealing ring is accommodated and which is open in a first direction radially inwardly to allow the sealing ring to engage the surface of a conduit inserted into the coupling, and the recess being open in a second direction axially facing the intermediate ring. The recess has an inner end wall and an axially extending wall and the arrangement can be such that a portion of the intermediate ring extends into the recess through the axial opening and in close facing relationship with the axially extending wall. This enables the trailing body part and the intermediate ring to nest together.

Thus, in a further form of the invention there is provided a coupling for coupling to an end of a conduit, the coupling being arranged to receive the conduit end and to retain the conduit end relative to the coupling, the coupling including,
a leading body part,
a grab ring for gripping the outer surface of the conduit end to restrain the conduit end against retraction out of the coupling, the grab ring being adjacent the leading body part, a sealing ring for sealing against the outer surface of the conduit end, an intermediate ring between the grab ring and the sealing ring a trailing body part adjacent the sealing ring, and a sleeve, the leading body part, the grab ring, the intermediate ring, the sealing ring and the trailing body part being aligned axially in the direction of insertion of a conduit end into the coupling, the trailing body part defining a recess in which the sealing ring is accommodated and which is open radially inwardly and axially in a direction facing the intermediate ring, the recess having an inner end wall and an axial wall and a portion of the intermediate ring extending into the recess through the axial opening.

In the above form of the invention, the portion of the intermediate ring that extends into the recess can prevent the sealing ring from egress from the recess. Thus, the sealing ring is prevented from shifting to a position in which it might become caught between other components of the coupling, such as between a protection ring that is employed to protect the sealing ring from contact with the grab ring, and the trailing body part.

In the above form of the invention, the portion of the intermediate ring that extends into the recess through the axial opening preferably is in close facing relationship with the axial wall, or even in frictional contact with the axial wall. In this manner, the intermediate ring can provide benefits in relation to maintaining the concentricity of the coupling by the portion of the ring that extends into the recess.

BRIEF DESCRIPTION OF THE DRAWINGS

In order that the invention may be more fully understood, some embodiments will now be described with reference to the figures in which.

DETAILED DESCRIPTION OF THE DRAWINGS

Figure 1:
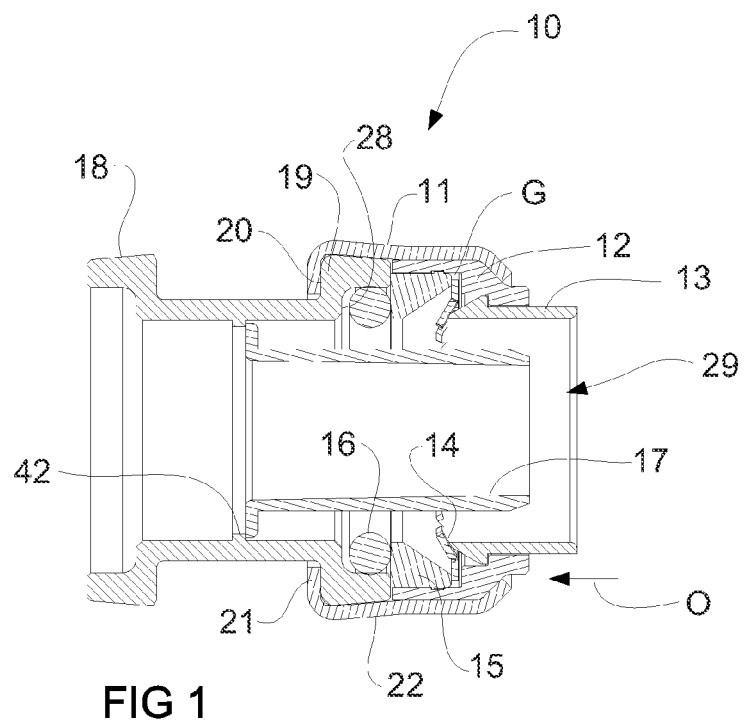
FIG. 1 is a cross-sectional view of a coupling according to one embodiment of the invention.
Figure 2:
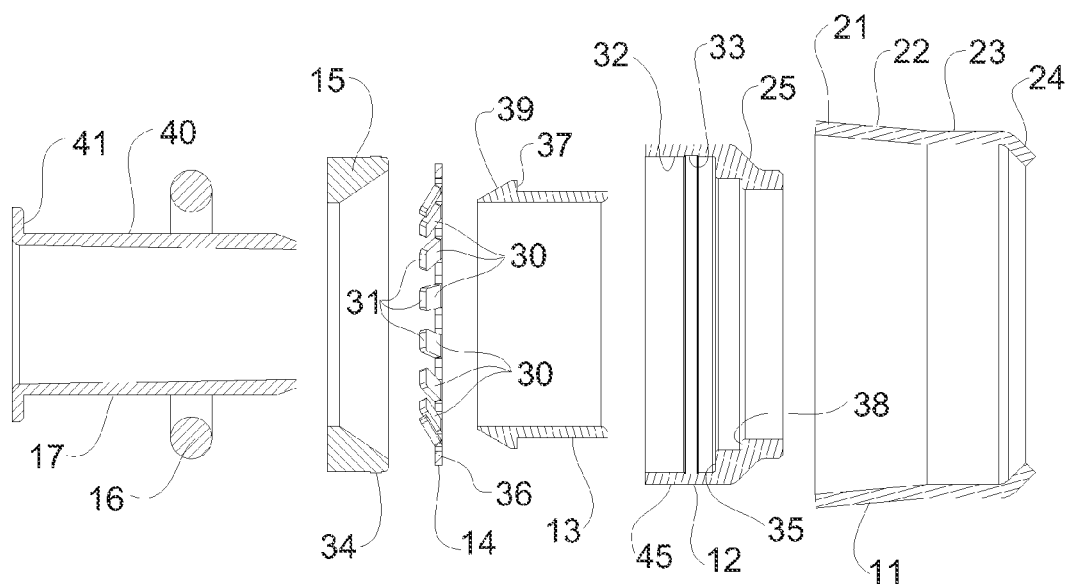
FIG. 2 is an exploded view of some of the parts of the coupling of FIG. 1.

With reference to FIGS. 1 and 2, a coupling 10 is illustrated which includes several components which generally can be of any suitable material unless stated otherwise. Where a preferred material exists, reference to that material is made. The coupling 10 includes a sleeve 11 which is preferably formed of a metal material and the preferred metal is stainless steel. The coupling further includes a leading body part or cartridge ring 12 which is preferably a plastic material, a demount ring 13, which, as will be explained later herein, can be used to disengage a pipe from the coupling 10, a metal grab ring 14, which is used to grab the outside surface of a pipe end which is inserted into the coupling 10, an intermediate ring or protection ring 15, a sealing rich or O-ring 16 and a tube liner 17. FIG. 1 shows a trailing body part or body 18 to which the sleeve 11 is attached, but that feature is not shown in FIG. 2. The body 18 is provided for attachment to a valve or other fitting, or it can be part of a valve or other fitting.

FIG. 2 is an exploded view of the assembly of FIG. 1 (without the body 18). From FIG. 1, it can be seen that the sleeve 11 overlies and engages each of the end 19 of the body 18, as well as the cartridge ring 12. The body end 19 defines an axially facing rear surface 20 which is overlaid by a radially inwardly extending portion 21 of the sleeve 11. That portion 21 is not shown in a radially inwardly extending disposition in FIG. 2, but rather, the portion 21 forms an extension of an inclined portion 22 of the sleeve 11. The inclined portion 22 extends from an axial portion 23, which extends to a radially inwardly extending portion 24. The portion 24 bears against a complementary shoulder surface 25 of the cartridge ring 12. Thus, by the sleeve 11 including the radially inwardly extending portions 21 and 25, to bear against the rear surface 20 of the body 18 and the shoulder surface 25 of the cartridge 12, the cartridge 12 and the body 18 are maintained in the position shown in FIG. 1.

The end 19 of the body 18 defines a recess or cavity 28 within which the O-ring seal 16 is positioned. The seal 16 is intended to bear against the outer surface of a conduit end (not shown) that is inserted into the coupling 10 through the opening 29 of the coupling 10. Axially adjacent the seal 16 is the protection ring 15, which is positioned intermediate the seal 16 and the grab ring 14. The protection ring 15 spaces the seal 16 from the grab ring 14 and prevents contact between the grab ring and the seal so that the seal 16 is not damaged by the grab ring 14. In this respect, the grab ring 14 is a metal component, and includes a plurality of teeth 30 (see FIG. 2) which have relatively sharp radially inner ends 31. Moreover, when a conduit end is inserted into the coupling 10, the teeth 30 are bent or displaced in the direction towards the seal 16. Accordingly, the protection ring 15 ensures that the grab ring 14 remains sufficiently spaced from the seal 16 to prevent the teeth ends 31 from damaging the seal 16.

The cartridge ring 12 includes a plurality of surfaces and steps for positioning components of the coupling 10. The protection ring 15 is located against the surface 32 of the cartridge ring 12 and in FIG. 2, an annular recess 33 is shown formed in that surface 32. The recess 33 is provided to receive an annular projection 34 of the protection ring 15 so as to locate the protection ring 15 relative to the cartridge 12. The protection ring 15 can simply be pushed into the cartridge ring 12 to snap the annular projection 34 into the recess 33 and thus secure the protection ring 15 within the cartridge 12.

A radial gap G exists between a leading end of the protection ring 15 and the step surface 35 of the cartridge ring 12. The gap G accommodates the annular periphery 36 of the grab ring 14. That accommodation is loose, allowing slight axial movement of the grab ring 14 within the gap G to provide the grab ring with some flexibility within the cartridge ring 12. With the annular periphery 36 of the grab ring 14 located between the protection ring 15 and the step surface 35 of the cartridge ring 12, the grab ring is also secured in place in the cartridge ring 12.

The demount ring 13 includes a shoulder 37 which abuts against a step surface 38 of the cartridge ring 12. By that abutment, the demount ring resists release from the coupling 10.

The demount ring 13 includes an inclined front surface 39 which is in close proximity to or actually in touching engagement with the teeth 30 of the grab ring 14. The demount ring 13 can be displaced further into the coupling 10 from that shown in FIG. 1 in the direction D to cause the inclined front surface 39 to engage and release the teeth 30 of the grab ring 14 from engagement with the outside surface of a conduit that has been inserted into the coupling 10. The demount ring 13 can be shifted in any suitable manner, although for some couplings, a special tool can be employed to push the demount ring 13 in the direction D.

The tube liner 17 includes an axial tube 40 and a lateral flange 41. The tube liner 17 is intended to fit within the end of a conduit inserted into the coupling 10 and to support the conduit end against collapse or distortion when the conduit end is fitted into the coupling 10. The lateral flange 41 locates the tube liner 17 against an annular projection 42 within the body 18.

Figure 3:
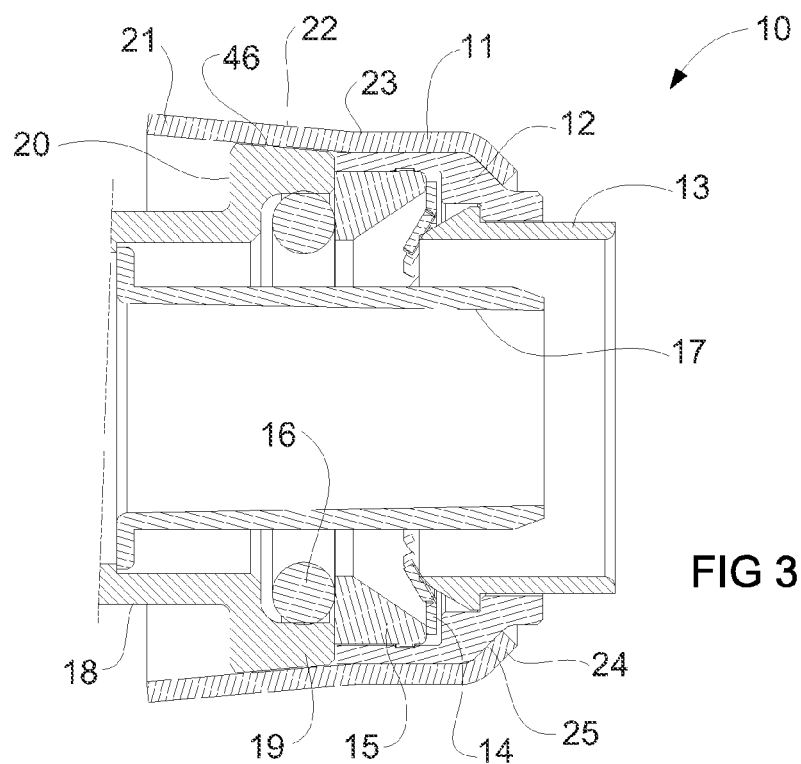
FIG. 3 is a cross-sectional view of the coupling of FIG. 1 with the sleeve shown in a pre formed condition.

FIG. 3 illustrates the coupling 10, but without the radially inward portion 21 of the sleeve 11 deformed to the position shown in FIG. 1. Thus, the portion 21 is shown as an extension of the inclined portion 22 of the sleeve 11. The sleeve is formed in this shape for assembly of the coupling 10.

In FIG. 3, it can be seen that the components of the coupling 10 can be inserted from the left-hand side of the figure. Thus, the sleeve 11 is open at the portion 21, so that all of the components can be inserted through that open end. In FIG. 3, each of the demount ring 13, the grab ring 14 and the protection ring 15 can be assembled within the cartridge ring 12 and inserted into the sleeve 11 as a single cartridge or unit. Thereafter, the O-ring seal 16 and the body end 19 can be assembled together and inserted into the sleeve 11. The assembly is therefore very simple.

Figure 4:
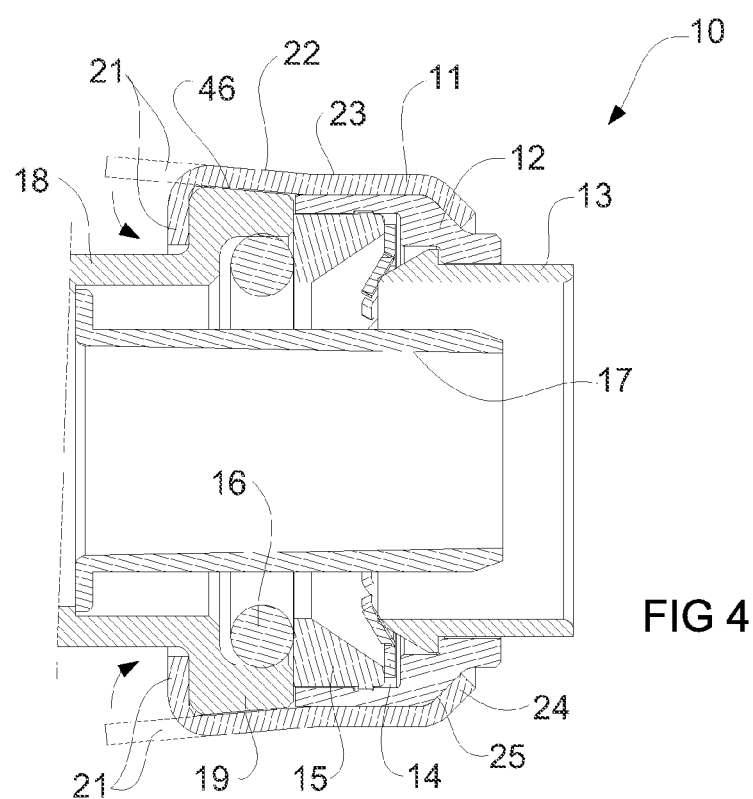
FIG. 4 is the cross-sectional view of FIG. 3 with the sleeve shown having been formed.

Once all of the components of the coupling 10 have been assembled as shown in FIG. 3, the portion 21 can be formed from the broken line position shown in FIG. 4 to the sold line position of that figure.

The arrangement of FIGS. 1 to 4 provides several advantages over some prior art couplings. In particular, the use of a forming operation to roll the portion 21 of the sleeve 11 enables the sleeve 11 to fit closely about the body end 19 and in close facing relationship with the rear surface 20 of the end 19.

The use of forming additionally does not require the sleeve 11 to be formed in separate parts that are fitted together, such as by a snap-fit or by a threaded connection, and thus the complexity of the coupling 10 is not increased by the present invention.

Further advantages are achieved by assembling the components of the coupling 10 through the end portion 21 of the sleeve 11. For example, it facilitates formation of the body 18 separately to the cartridge ring 12 which reduces the length of the body 18 compared to prior art arrangements and allows faster manufacture of the body and the cartridge ring.

Further advantages include that a more economical material can be used for the body because the body does not need to be a formable material. The body for example can be of cast brass or, more preferably, of moulded plastic.

In addition, the arrangement of the coupling 10 permits use of a body of more complex construction than in the past, because it can be a moulded material such as a moulded plastic material. Thus, the body can include complex detail rather than having to machine the fitting, for example a valve, to include the complex detail.

Still further, the inclined portion 22 of the sleeve 11 cooperates with a complementary inclined surface 46 (see FIGS. 3 and 4) of the body end 19 to hold the sleeve and the body 18 together prior to forming of the end portion 21 of the sleeve 11. Effectively the sleeve 11 and the body 18 lock together and this is advantageous because it means that the coupling are not otherwise required to be held within the sleeve by other means while the forming operation is carried out. Moreover, the connection that can be achieved enables the coupling to be shifted between different manufacturing stations without the sleeve coming loose. The connection also locates the sleeve and body concentrically about the axis of the coupling.

The angle of the inclined portion 22 and the inclined surface 46 can be selected to be any suitable angle but a suitable range is expected to be between 2° and 20°. An angle of 5° has been successfully tested and provides a suitable holding load.

The cartridge ring 12 illustrated in FIGS. 1 to 4 includes an elongate ring portion 45 to accommodate the grab ring 14 and the protection ring 15. In an alternative embodiment of the invention, the ring portion 45 is not provided. This arrangement is illustrated in FIGS. 5 and 6 and reference will now be made to those figures.

Figure 5:
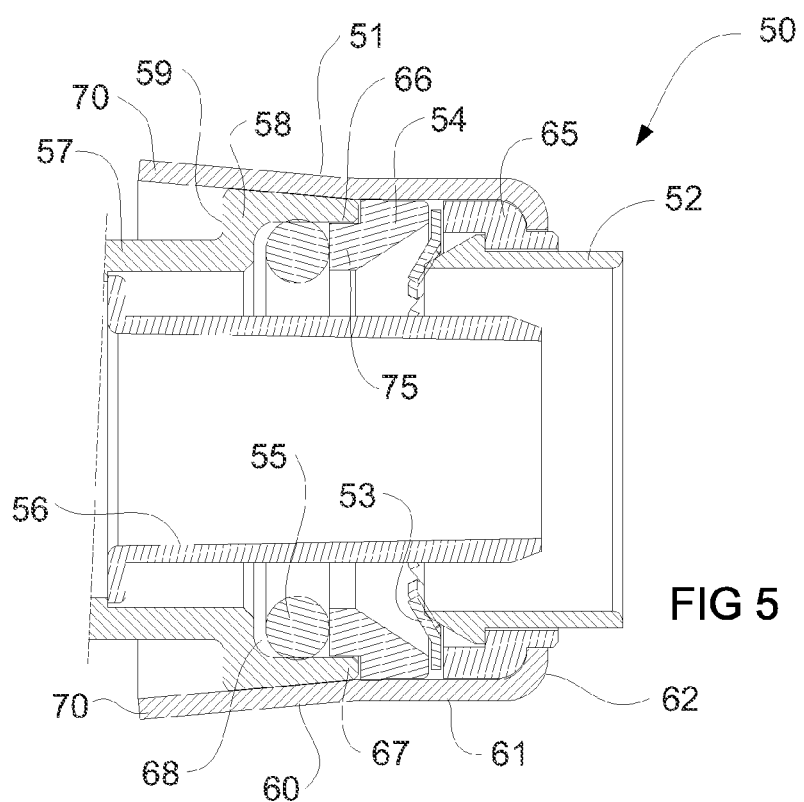
FIG. 5 is a cross-sectional view of coupling according to another embodiment of the invention with the sleeve of the coupling shown in a pre formed condition.
Figure 6:
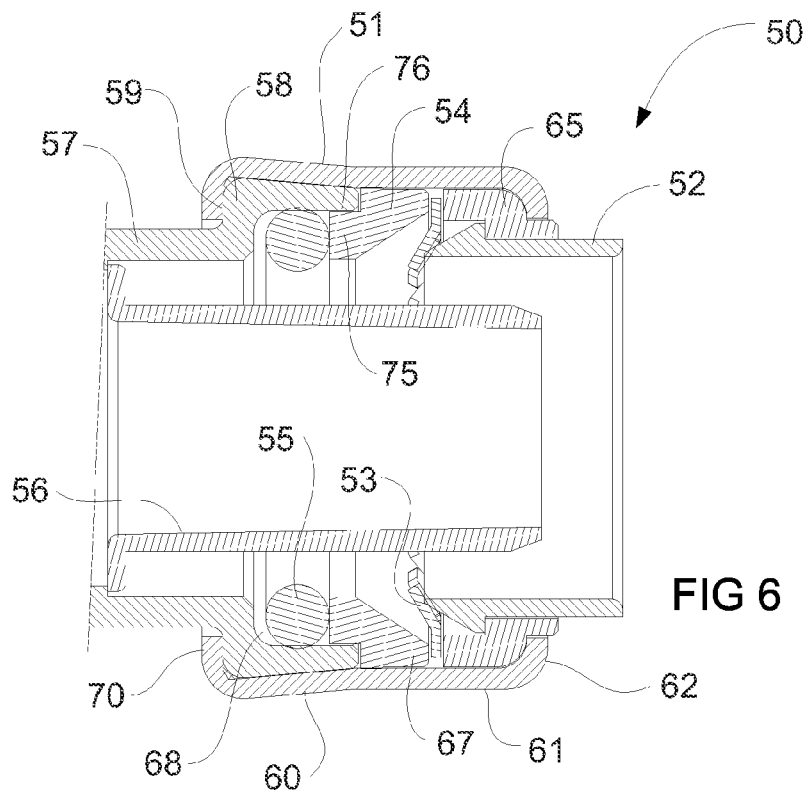
FIG. 6 is the cross-sectional view of FIG. 5 with the sleeve shown having been formed.

The coupling 50 shown in FIGS. 5 and 6 includes many of the same features of the coupling 10 of the earlier figures. Thus, the coupling 50 includes a sleeve 51, a demount ring 52, a grab ring 53, a protection ring 54, an O-ring seal 55, a tube liner 56, a body 57, a body end 58 and a rear face 59. The sleeve 11 includes an inclined portion 60, an axial portion 61 and a radially inward portion 62.

Where the coupling 50 differs significantly from the coupling 10, is that the coupling 50 includes a spacer ring 65 rather than a cartridge ring 12 of the coupling 10. The spacer ring 65 does not include the elongate ring portion 45 of the cartridge ring 12. Thus, the spacer ring 65 does not enclose or accommodate either of the grab ring 53 or the protection ring 54. Instead, the sleeve 51 locates the grab ring 53 and the protection ring 54 axially, as shown in FIGS. 5 and 6. Thus, the grab ring is positioned between facing surfaces of the spacer ring 65 and the protection ring 54, while the protection ring 54 includes a recess 66 to accommodate a forward end 67 of the body end 58. By this later arrangement, the body end 58 nests with the protection ring 54.

Like the coupling 10, the body end 58 defines a recess 68 for accommodating the seal 55.

FIG. 5 shows the sleeve 51 with an end portion 70 extending from the inclined portion 60. In that position, the components of the coupling 50 can be inserted into the sleeve 51 through the open end of the sleeve. Thus, the components which are shown internally of the sleeve 51 can be inserted for axial alignment. Thereafter, the end 70 can be formed to the position shown in FIG. 6 in the same manner as described for the end portion 21 of the sleeve 11.

FIGS. 5 and 6 also show a portion 75 of the protection ring 54 extending into the recess 68 of the body end 58. The portion 75 axially locates the O-ring seal 55. Moreover, by extending into the recess 68, the portion 75 prevents the seal 55 from moving out of the recess 68. Thus, the seal 55 is captured within the recess 68 where it is intended to be maintained.

The surface 76 (FIG. 6) of the portion 75 is in close facing relationship with the facing surface of the forward end 67 of the body end 58. By this arrangement, the protection ring 54 is maintained substantially concentric within the sleeve 51. This is important during assembly of the components 50.

In other respects, operation of the coupling 50 is very similar to the coupling 10. The forming operation is performed once each of the components has been axially inserted into the sleeve 11.

Figure 7:
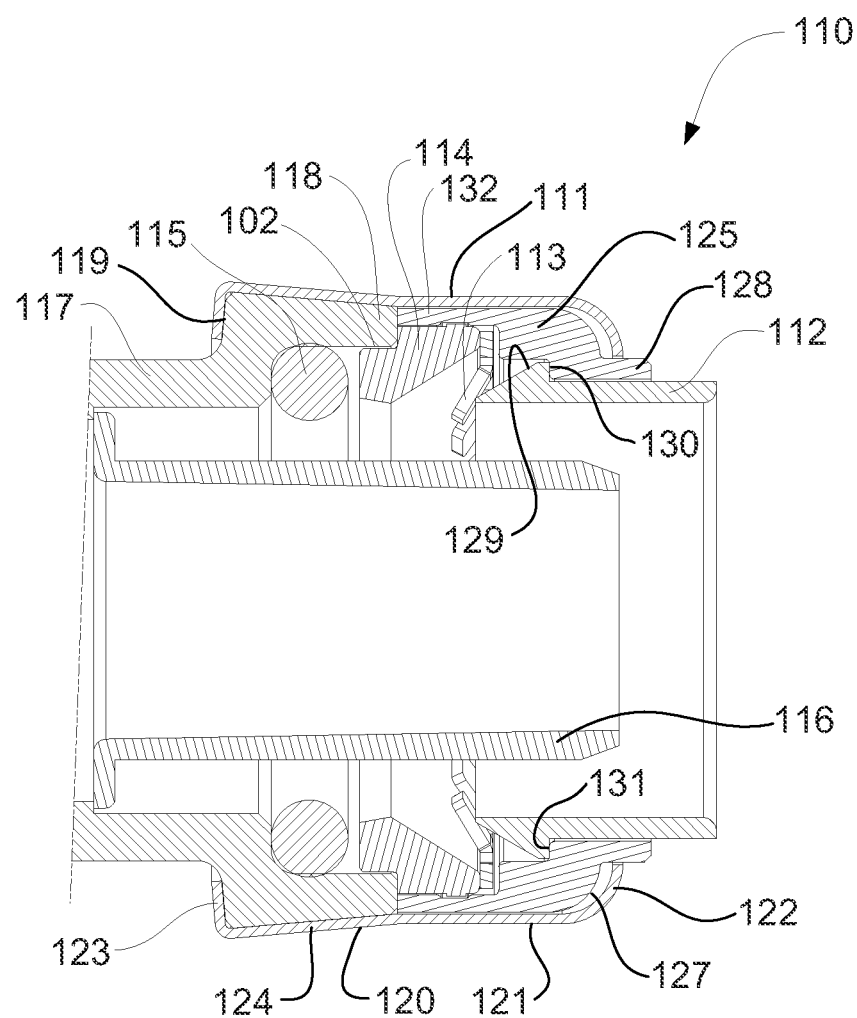
FIG. 7 is a cross-sectional view of a coupling according to another embodiment of the invention.

A further coupling 110 is illustrated in FIG. 7 and includes many of the same features of the earlier couplings 10 and 50. Thus, the coupling 110 includes a sleeve 111, a demount ring 112, a grab ring 113, an intermediate or protection ring 114, an O-ring seal 115, a tube liner 116, a body 117 which forms a trailing body part, a body end 118 and a rear body face 119.

The sleeve 111 includes an inclined portion 120, an axial portion 121 and a radially inward extending portion 122. At the end remote from the portion 122, the sleeve includes a portion 123 which closely faces rear body face 119. The sleeve 111 thus is substantially identical to the sleeves 11 and 51.

The body 117 further includes an inclined surface 124 which underlies the facing surface of the inclined portion 120.

A cartridge ring 125 forms a leading body part and includes an axial surface 126 which underlies the facing surface of the axial portion 121 and a curved shoulder surface 127 which underlies the radially inward extending portion 122. An annular portion 128 extends through a forward end of the sleeve 111 at the radially inward extending portion 122. The cartridge ring 125 includes a ring portion 132 to accommodate the grab ring 113 and the protection ring 114.

The grab ring 112 includes an inclined forward end 129 and defines a shoulder 130 that engages against a facing shoulder 131 of the cartridge ring 125 to prevent release of the grab ring from the coupling 110.

The major difference between the coupling 110 and the coupling 10 is that the protection ring 114 is formed to extend into the body end 118 of the body 117. The major difference between the coupling 110 and the coupling 50 is the inclusion of a cartridge ring 125 rather than a spacer ring, whereby the cartridge ring 125 of the coupling 110 includes a ring portion 132 that the spacer ring 65 of the coupling 50 does not. This illustrates that the parts of couplings 10, 50 and 110 can be interchanged to form different coupling arrangements.

It is not intended in any of the couplings 10, 50 or 110, that the components within the respective sleeves 11, 51 or 111 are rigidly held within those sleeves. Indeed, in coupling 10, is it intended that the cartridge ring 12 and the components disposed within it (the demount ring 13, the grab ring 14 and the protection ring 15), have a small amount of movement within the ring 12. For example, in respect of the coupling 10, with the portion 21 of the sleeve 11 formed about the rear face 20 of the body end 19, there is intended to be approximately 1.5 mm maximum clearance between the portion 21 and the rear face 20. In addition, the portion 24 of the sleeve 11 at the other end of the sleeve is intended to have a maximum clearance of approximately 0.5 mm from the inclined shoulder surface 25 of the cartridge ring 12. Thus, the cartridge ring 12 and the components it accommodates have a small degree of floating movement available between the portions 21 and 24 of the sleeve 11.

The invention described herein is susceptible to variations, modifications and/or additions other than those specifically described and it is to be understood that the invention includes all such variations, modifications and/or additions which fall within the spirit and scope of the present disclosure.

The invention claimed is:

1. A pipe coupling for coupling to an end of a conduit, said pipe coupling being arranged to receive the conduit end and to retain the conduit end relative to said pipe coupling, said pipe coupling comprising:

a trailing body part comprising a pipe segment terminating at a pipe proximal end, said pipe segment having a first diameter portion with an axial internal surface and an axial external surface, said pipe proximal end having a second diameter portion with an axial internal surface and an inclined external surface, said pipe proximal end having a radially disposed exterior surface between said external surface of said pipe segment and said external surface of said pipe proximal end, said pipe proximal end having a radially disposed interior surface between said internal surface of said pipe segment and said internal surface of said pipe proximal end, said second diameter portion being greater than said first diameter portion such that an annular cavity is formed within said pipe proximal end;

an annular sealing ring mounted within said annular cavity adjacent said radially disposed interior surface for sealing against an outer surface of the conduit end;

a leading body part comprising an annular member having an exterior surface, an interior surface, a proximal end, and a distal end in abutment with said pipe proximal end, said exterior surface of said leading body part comprising an axial surface and a curved shoulder surface, said interior surface of said leading body part comprising a first axial surface and a second axial surface, a first step surface and a second step surface, and an annular recess formed in said second axial surface;

an intermediate ring comprising a proximal portion and a distal portion, said proximal portion mounted within said leading body part, said proximal portion including an annular projection for engaging said annular recess of said leading body part to secure said intermediate ring to said leading body part, said distal portion extending into said annular cavity of said trailing body part such that said sealing ring is mounted within said annular cavity between said distal portion of said intermediate ring and said radially disposed interior surface of said trailing body part;

a grab ring for gripping the outer surface of the conduit end to restrain the conduit end against retraction out of said coupling, said grab ring mounted within said leading body part between said proximal portion of said intermediate ring and said second step surface;

a demount ring comprising an angled surface and a shoulder mounted within said leading body part between said grab ring and said first step surface, said angled surface being operable to slidably engage said grab ring and thereby disengage said grab ring from the outer surface of the conduit end to allow removal of the conduit end from said coupling; and a sleeve having a proximal terminal segment overlying said curved shoulder surface of said exterior surface of said leading body part, an axial segment overlying said axial surface of said exterior surface of said leading body part, an inclined segment overlying said inclined external surface of said trailing body part, and a radially disposed distal terminal segment overlying said radially disposed exterior surface of said trailing body part, said sleeve being operable to maintain said leading body part in abutment with said trailing body part and thereby resist movement of said leading body part and said trailing body part axially away from each other;

wherein said trailing body part, said sealing ring, said leading body part, said intermediate ring, said grab ring, and said demount ring are aligned axially in the direction of insertion of the conduit end into said coupling.

2. A pipe coupling according to claim 1, wherein an angle of said inclined external surface is from 2 degrees to 20 degrees.

3. A pipe coupling according to claim 1, wherein an angle of said inclined external surface is 5 degrees.

4. A pipe coupling for coupling to an end of a conduit, said pipe coupling being arranged to receive the conduit end and to retain the conduit end relative to said pipe coupling, said pipe coupling comprising:

a trailing body part comprising a pipe segment terminating at a pipe proximal end, said pipe segment having a first diameter portion with an axial internal surface and an axial external surface, said pipe proximal end having a second diameter portion with an axial internal surface and an inclined external surface, said pipe proximal end having a radially disposed exterior surface between said external surface of said pipe segment and said external surface of said pipe proximal end, said pipe proximal end having a radially disposed interior surface between said internal surface of said pipe segment and said internal surface of said pipe proximal end, said second diameter portion being greater than said first diameter portion such that an annular cavity is formed within said pipe proximal end;

an annular sealing ring mounted within said annular cavity adjacent said radially disposed interior surface for sealing against an outer surface of the conduit end;

a leading body part comprising an annular member having an exterior surface, an interior surface, a proximal end, and a distal end in abutment with said pipe proximal end, said exterior surface of said leading body part comprising an axial surface and a shoulder surface, said interior surface of said leading body part comprising a first axial surface and a second axial surface, a first step surface and a second step surface, and an annular recess formed in said second axial surface;

an intermediate ring comprising a proximal portion mounted within said leading body part, said proximal portion including an annular projection for engaging said annular recess of said leading body part to secure said intermediate ring to said leading body part;

a grab ring for gripping the outer surface of the conduit end to restrain the conduit end against retraction out of said coupling, said grab ring mounted within said leading body part between said proximal portion of said intermediate ring and said second step surface; and a sleeve having a proximal segment overlying said shoulder surface of said exterior surface of said leading body part, an axial segment overlying said axial surface of said exterior surface of said leading body part, an inclined segment overlying said inclined external surface of said trailing body part, and a radially disposed distal terminal segment overlying said radially disposed exterior surface of said trailing body part, said sleeve being operable to maintain said leading body part in abutment with said trailing body part and thereby resist movement of said leading body part and said trailing body part axially away from each other;

wherein said trailing body part, said sealing ring, said leading body part, said intermediate ring, and said grab ring are aligned axially in the direction of insertion of the conduit end into said coupling.

5. A pipe coupling according to claim 4, wherein said intermediate ring further comprises a distal portion, said distal portion extending into said annular cavity of said trailing body part such that said sealing ring is mounted within said annular cavity between said distal portion of said intermediate ring and said radially disposed interior surface of said trailing body part.

6. A pipe coupling according to claim 4, further comprising a demount ring comprising an angled surface and a shoulder mounted within said leading body part between said grab ring and said first step surface, said angled surface being operable to slidably engage said grab ring and thereby disengage said grab ring from the outer surface of the conduit end to allow removal of the conduit end from said coupling.

7. A pipe coupling according to claim 4, wherein an angle of said inclined external surface is from 2 degrees to 20 degrees.

8. A pipe coupling according to claim 4, wherein an angle of said inclined external surface is 5 degrees.

9. A pipe coupling for coupling to an end of a conduit, said pipe coupling being arranged to receive the conduit end and to retain the conduit end relative to said pipe coupling, said pipe coupling comprising:

a trailing body part comprising a pipe segment terminating at a pipe proximal end, said pipe segment having a first diameter portion with an internal surface and an external surface, said pipe proximal end having a second diameter portion with an internal surface and an inclined external surface, said pipe proximal end having a radially disposed exterior surface between said external surface of said pipe segment and said external surface of said pipe proximal end, said pipe proximal end having a radially disposed interior surface between said internal surface of said pipe segment and said internal surface of said pipe proximal end, said second diameter portion being greater than said first diameter portion such that an annular cavity is formed within said pipe proximal end;

an annular sealing ring mounted within said annular cavity adjacent said radially disposed interior surface for sealing against an outer surface of the conduit end;

a leading body part comprising an annular member having an exterior surface, an interior surface, a proximal end, and a distal end in abutment with said pipe proximal end, said exterior surface of said leading body part comprising an axial surface and a shoulder surface, said interior surface of said leading body part comprising an axial surface having an annular recess formed therein and a step surface;

an intermediate ring mounted within said leading body part, said intermediate ring including an annular projection for engaging said annular recess of said leading body part to secure said intermediate ring to said leading body part;

a grab ring for gripping the outer surface of the conduit end to restrain the conduit end against retraction out of said coupling, said grab ring mounted within said leading body part between said intermediate ring and said step surface; and a sleeve having a proximal segment overlying said shoulder surface of said exterior surface of said leading body part, an axial segment overlying said axial surface of said exterior surface of said leading body part, an inclined segment overlying said inclined external surface of said trailing body part, and a radially disposed distal terminal segment overlying said radially disposed exterior surface of said trailing body part, said sleeve being operable to maintain said leading body part in abutment with said trailing body part and thereby resist movement of said leading body part and said trailing body part axially away from each other;

wherein said trailing body part, said sealing ring, said leading body part, said intermediate ring, and said grab ring are aligned axially in the direction of insertion of the conduit end into said coupling.

10. A pipe coupling according to claim 9, wherein an angle of said inclined external surface is from 2 degrees to 20 degrees.

11. A pipe coupling according to claim 9, wherein an angle of said inclined external surface is 5 degrees.

* * * * *